Patented Dec. 25, 1934

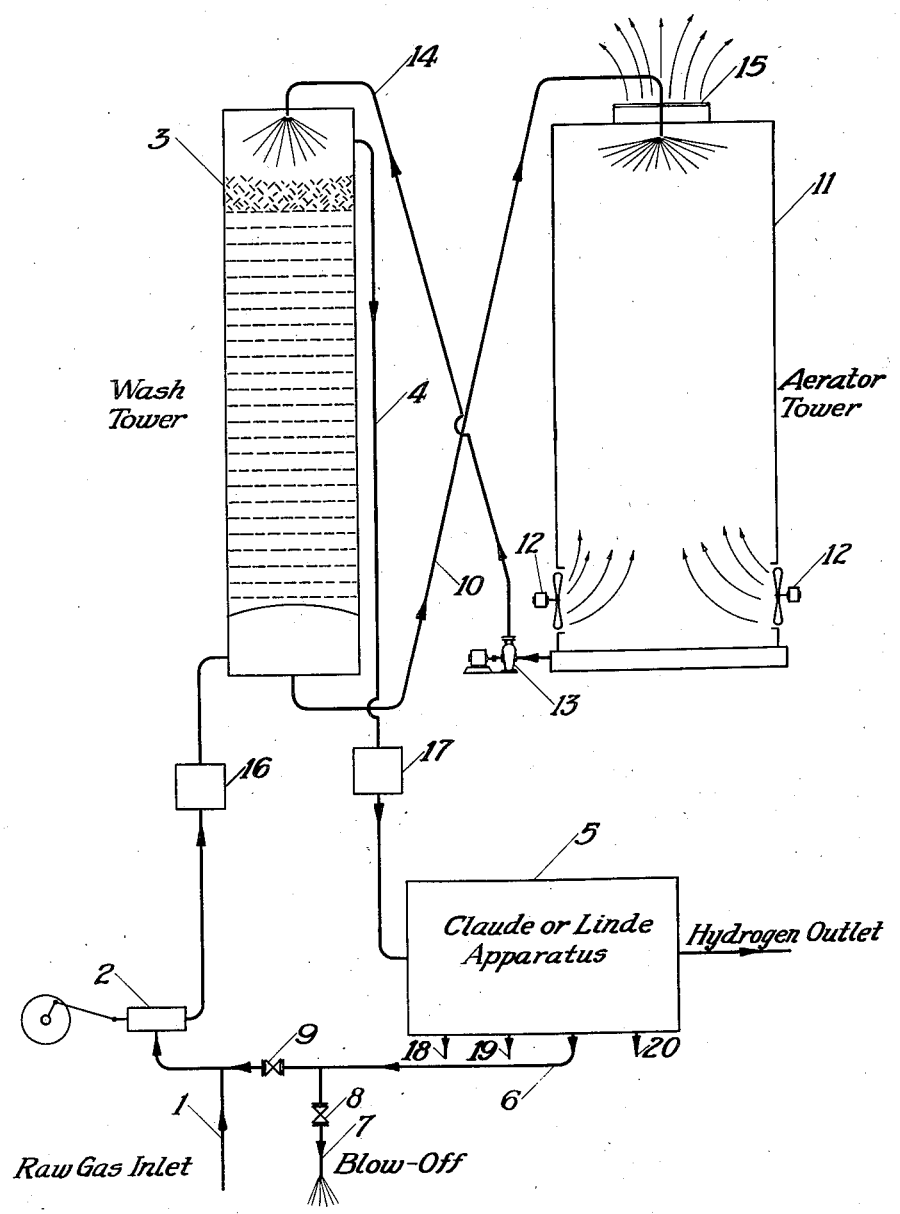

1,985,548

UNITED STATES PATENT OFFICE 1,985,548

PROCESS FOR THE REMOVAL OF ACETYLENE

Daniel Pyzel, Piedmont, Calif., assignor to Shell Development Company, San Francisco, Calif., a corporation of Delaware Application June 14, 1932, Serial No. 617,110

4 Claims. (Cl. 62—175.5)

This invention is related to the removal of acetylene from gases and is more particularly concerned with the removal of the acetylene by the use of solvents.

In the fractionation of mixed hydrocarbon gases for the production of pure hydrogen by partial liquefaction at low temperatures, a great deal of trouble has been experienced due to the presence of acetylene which is invariably present to some extent in such gases.

The main difficulty resides in the removal of the last traces of acetylene since in order to effect this removal, temperatures must be utilized so low that acetylene condenses as a solid. This solid accumulates inside the apparatus and cannot be removed without interrupting the process.

It has previously been found that ethylene will liquefy at approximately the same temperature at which acetylene will condense as a solid, so that if ethylene is present in sufficient quantity in the gases to be fractionated, the liquid ethylene will dissolve the solid acetylene and remove it from the apparatus in solution.

For the proper operation of this method of acetylene removal, the ratio of ethylene to acetylene should not fall below a certain minimum value.

It is a purpose of this invention to build up the ratio of ethylene to acetylene in the gas stream passed to the fractionating apparatus.

Now, I have found that this ratio of ethylene to acetylene can be materially increased by producing in the fractionating apparatus a fraction high in ethylene content and recirculating part or all of this fraction into the main gas stream ahead of the extraction step, in which acetylene is extracted with a solvent that has a higher relative solubility for acetylene than for ethylene, such as, water, acetone or carbitol, etc., before the low temperature fractionation.

During subsequent fractionation the ethylene will prevent accumulation of solid acetylene in the fractionation apparatus.

In order that the invention may be clearly understood and readily carried into effect, the same will now be described more fully with reference to the accompanying drawing which illustrates by way of example a diagrammatic flow sheet of my process.

Mixed gas containing besides hydrogen, both acetylene and ethylene, for instance, coke oven gas or gas produced by the thermal decomposition of hydrocarbons, is introduced into the system by a pipe (1). The gas mixture is raised to a suitable high pressure by means of a multi-stage compressor indicated at (2).

After some heavier hydrocarbons such as benzol may have been removed by suitable means, indicated by numeral (16), the compressed gas is next passed through a tower (3) where it is scrubbed by passing countercurrent to water flowing downward over suitable packing.

The effect of this intense water wash is to dissolve most of the acetylene contained in the gas stream as well as amounts of carbon dioxide, hydrogen, and some ethylene, et cetera.

The water carrying amounts of dissolved acetylene removed from the mixed gas in the water wash tower (3) is withdrawn from the bottom of the tower by a pipe (10) and is sprayed into the top of an aeration tower (11) in which the water is exposed to a current of air supplied by suitable air blowers (12). The air removes the acetylene and other dissolved gases from the water. Air, acetylene, etcetera, are led off from the tower through opening (15). The water freed from acetylene collects in the bottom of the aeration tower. This water is withdrawn by a pump (13) and conducted by pipe (14) to the top of tower (3) into which it is again sprayed.

The hydrogen containing gas freed of most of its acetylene content leaves the top of tower (3) by a pipe (4) and after passing through washers, indicated generally by numeral (17), (for the removal of carbon dioxide, et cetera), flows into suitable Linde, Claude or other type of low temperature condensation and fractionation apparatus indicated at (5). In apparatus (5) the temperature of the gas is gradually lowered causing separation of condensible constituents in order of their liquefaction points. These fractions can be separately or collectively withdrawn through pipes (18), (19) and (20). A fraction containing ethylene, some acetylene, as well as other hydrocarbons is withdrawn from the fractionation apparatus through pipe (6). This fraction can be partially blown off from the system by means of blow-off pipe (7) controlled by a valve (8). The ethylene-acetylene fraction not blown off is led back and mixed with the gas entering the system through pipe (1). The percentage mixed with the incoming gas can be regulated by manipulation of valves (8) and (9), as will be apparent from the drawing.

The fraction mixed with the incoming gas again flows through the various washers into the water wash tower (3) as described above.

The manner in which my process operates is as follows:

When the process is started using raw gas with a low ethylene content, the ethylene content in the gas leaving the wash tower (3) may not be sufficient to completely dissolve the remaining acetylene in the gas stream during the low temperature fractionation. The acetylene which is dissolved is removed together with the ethylene through pipe (6) and all or part of this ethylene-acetylene fraction is returned and mixed with the incoming raw gas. By this mixing, the raw gas is enriched in ethylene, but also in acetylene.

The subsequent water wash again removes a substantial amount of the acetylene so that the gas passing to the low temperature fractionation apparatus contains ethylene in a higher ratio to acetylene than without this recirculation.

By means of the increased quantity of ethylene the acetylene is now prevented from collecting as a solid in the apparatus. Any solid acetylene which accumulated in the apparatus during the first short time of operation is dissolved again. By continued returning to the raw gas stream of part of the ethylene-acetylene fraction withdrawn through (6) the ethylene-to-acetylene ratio of the gas passing to the low temperature fractionation apparatus can be so increased that collection of solid acetylene in the apparatus can be entirely prevented.

I claim as my invention:

1. A process of removing acetylene from a mixed stream of hydrocarbon gases which comprises subjecting the mixture to the action of a solvent having better solvent power for acetylene than for ethylene, subjecting the resultant gas to a low temperature fractionation process, thereby producing a fraction containing all ethylene present in the gas subjected to the low temperature fractionation together with the acetylene dissolved therein, and returning all or part of said ethylene-acetylene fraction with the same ratio of acetylene as present therein on production of the fraction by the low temperature fractionation process without further separation of acetylene by rectification or chemical treatment directly to the incoming gas stream passing to said solvent treatment.

2. A process of removing acetylene from a mixed stream of hydrocarbons which comprises compressing a gaseous mixture of hydrocarbon to a high pressure, subjecting said mixture to a countercurrent flow of solvent having better solvent power for acetylene than for ethylene, passing the resultant gas through a low temperature fractionation apparatus, thereby producing a fraction containing all ethylene present in the gas subjected to the low temperature fractionation together with the acetylene dissolved therein, and returning all or part of said ethylene-acetylene fraction with the same ratio of acetylene as present therein on production of the fraction by the low temperature fractionation process without further separation of acetylene by rectification or chemical treatment directly to the incoming gas stream passing to said solvent treatment.

3. A process of removing acetylene from a mixed stream of hydrocarbons which comprises removing a substantial part of acetylene by a water wash, subjecting the resultant gas to a low temperature fractionation process, thereby producing a fraction containing all ethylene present in the gas subjected to the low temperature fractionation together with the acetylene dissolved therein, and returning all or part of said ethylene-acetylene fraction with the same ratio of acetylene as present therein on production of the fraction by the low temperature fractionation process without further separation of acetylene by rectification or chemical treatment directly to the incoming gas stream passing to said water wash.

4. A process of removing acetylene from a mixed stream of hydrocarbons which comprises compressing a gaseous mixture of hydrocarbons to a high pressure, subjecting said mixture to a water wash in a wash tower, passing the resultant gas through a low temperature fractionation apparatus thereby producing a fraction containing all ethylene present in the gas subjected to the low temperature fractionation together with the acetylene dissolved therein, and returning all or part of said ethylene-acetylene fraction with the same ratio of acetylene as present therein on production of the fraction by the low temperature fractionation process without further separation of acetylene by rectification or chemical treatment directly to the incoming gas stream passing to said water wash.

DANIEL PYZEL.